3,269,864
ELECTRODES FOR ALKALINE STORAGE
BATTERIES
Karl Ackermann, Mannheim, and Leo Schlecht, Ludwigshafen (Rhine), Germany, assignors, by mesne assignments, to Societe des Accumulateurs Fixeset de Traction (Societe Anonyme), Pont de la Folie, Romainville, Seine, France, a French company
No Drawing. Filed Mar. 21, 1963, Ser. No. 266,794
Claims priority, application Germany, Mar. 23, 1962,
B 66,487
7 Claims. (Cl. 136—78)

This invention relates to a process for the production of electrodes for alkaline storage batteries which electrodes consist of an electrode grid which is inactive to the electrolyte, porous and at least partly metallic, and an active material comprising oxidic compounds of the metal contained in the electrode grid. In order to introduce the active material into the pores of the electrodes, which have been prepared for example by sintering nickel powder, the electrodes have hitherto been impregnated with a solution of nickel nitrate, then treated with alkali solution to precipitate in the pores the nickel hydroxide which is to serve as the active material, and then washed and dried. These operations are repeated several times to achieve the completest possible filling of the pores with the active material.

According to U.S. application Serial No. 214,160, filed July 25, 1962, by Karl Ackermann, the said troublesome method may be simplified by utilizing the metallic electrode grid itself for the formation of the active material by subjecting it to an oxidizing treatment in the presence of a weakly basic metal and subsequently treating it with a solution of an alkali metal hydroxide to form the active substance.

It is the object of the present invention to provide a process for the production of electrodes of the said type in which the active material is formed by the metal of the grid itself and the step of treating the grid with an alkaline solution may be omitted.

According to the present invention, the said object is achieved by allowing ammonium compounds, particularly ammonium salts, to act on the electrode grid under oxidizing conditions.

For example the electrode grid may be impregnated with an aqueous solution of ammonia or an ammonium salt, for example ammonium chloride, and the grid then exposed to an atmosphere of ammonia, water vapor and air or oxygen at elevated temperature. A considerable activation of the electrode grid is obtained in this simple way.

Embodiments of the process in which ammonium ions together with oxidizing anions act on the electrode grid have proved to be particularly suitable. Aqueous ammonium nitrate solution fulfils these conditions in an effective way. The electrode grid is impregnated with an aqueous ammonium nitrate solution and then dried by heating. If nickel nitrate be added to the ammonium nitrate solution, active material is additionally introduced from outside into the pores if impregnation with the said solution is followed by a treatment with alkali solution so that the nickel nitrate added to the solution is converted to nickel hydroxide.

The additional action of nickel nitrate may also take place before or after the treatment with ammonium salt solution. For example the sintered nickel grid may be first impregnated with strong nickel nitrate solution, dried, placed for a short time in concentrated aqueous ammonia solution and then exposed to an atmosphere of water vapor and air at elevated temperature, or the sintered grid impregnated with nickel nitrate solution is brought at elevated temperature into an atmosphere laden with water vapor and ammonia, for example at temperatures around 100° C. in a stream of ammonia gas substantially saturated with water vapor.

Instead of a combination of ammonium salts with nickel nitrate, nickel ammine salts, for example tetra-ammine nickel nitrate, are also suitable. Although these salts give with water much more dilute solutions than for example ammonium nitrate and nickel nitrate, good capacities may be achieved with such solutions if the electrodes, after having been impregnated with the solutions, are heated to temperatures of about 150° C. or more and this treatment is repeated.

By varying the concentration of the activating solution, the reaction period in the moist condition at elevated temperature and the height of the temperature, the degree of activation may be influenced. A high degree of activation can be achieved by exposing electrode grids impregnated with the solution to an atmosphere laden with water vapor and ammonia for a long period, for example several hours, at elevated temperature, for example at 100° C. The activation process is as a rule stopped as soon as the active material necessary for the achievement of the desired capacity has been formed, since the grid remaining should be adequate for conducting the electric current and sufficiently strong for mechanical cohesion.

Particularly in the case of highly porous grids which would be too greatly weakened by extensive activation by the process according to this invention, it may be advantageous to stop the activation in good time and to introduce further active material from outside by prior art methods.

Particularly extensive activation of the grid may be achieved without endangering its mechanical strength if the activation is allowed to proceed in a weakly acid to weakly alkaline medium, preferably at a pH value within the range of 4 to 10. For this purpose, small amounts of a weak acid, for example acetic acid, propionic acid, citric acid, or derivatives of these acids, may be added to the activating solution. Compounds having amphoteric character, for example acids of the said kind containing amino groups, for example glycocoll, are suitable for this purpose. Inorganic compounds having amphoteric properties or forming amphoteric compounds during the activation process, may also be used. Aluminum and zinc salts are examples of this group. Aluminum nitrate is particularly suitable.

Thin foil-like grids which have been prepared by sintering very fine nickel powder obtained by thermal decomposition of nickel carbonyl exhibit, after they have been activated by the use of the said additives, satisfactory mechanical strength when used as electrodes, even when more than half of the grid has been converted into nickel hydroxide by the activation. Electrodes of this type are furthermore ductile and flexible and may even be bent over a small radius without breaking; this is very desirable when the electrodes are to be installed in accumulators in a narrow space.

It has been found that after using the process according to this invention, considerably less alkali solution and water is required in the usual aftertreatment of the electrodes with alkali solution and washing with water, and in many cases such an aftertreatment with alkali solution may be omitted, if the treatment is finished off by heating, advantageously in the presence of water or water vapor.

If necessary the electrodes may also be subjected more than once to the activation according to the embodiment described.

The following examples will further illustrate the invention. Parts are by weight.

*Example 1*

A porous plate prepared by sintering nickel powder with a perforated metal foil embedded therein during sintering, the plate having a weight of about 4 g. and the dimensions 80 x 20 x 1.2 mm., is immersed for a few seconds in a solution of 50 g. of ammonium nitrate in 100 g. of water. The plate absorbs about 1.5 g. of solution. The plate is exposed to an atmosphere saturated with steam with access of air, first for about twenty minutes at about 50° C. and then for two hours at 95° to 100° C. After this treatment, the plate is placed in a hot caustic potash solution at about 70° C. for about an hour and then washed with water and dried. The weight of the plate is then 0.77 g. more than its original weight. About 1.3 g. of the sintered nickel has been converted into nickel hydroxide. When used as an electrode, the plate has a capacity of about 0.45 ampere hours and retains good mechanical strength after being frequently charged and discharged.

*Example 2*

A porous nickel plate having the dimensions 77 x 18 x 1.7 mm., a weight of 9 g. and a pore volume of about 56% is immersed for about ten seconds in a solution of 3 parts of ammonium nitrate and 4 parts of crystallized nickel nitrate in 4 parts of water. The plate is then exposed as described in Example 1 to the action of elevated temperature in the presence of water vapor and then treated with caustic potash solution, washed and dried. Its weight has increased by 1.08 g. About 0.23 g. of this increase in weight is accounted for by nickel hydroxide introduced by the solution. The remainder of the increase in weight is due to the formation of about 2.3 g. of nickel hydroxide by oxidation of the nickel grid. When used as an electrode, the plate, in spite of its relatively low pore volume, has a capacity of 0.65 ampere hours and good mechanical strength.

*Example 3*

A porous plate of the type described in Example 1 having a weight of about 4 g. and the dimensions 80 x 20 x 1.2 mm. is impregnated by immersion in a solution of 6 parts of ammonium nitrate, 6 parts of crystallized nickel nitrate and 2 parts of glacial acetic acid in 6 parts of water. The plate absorbs 2 g. of solution. The plate is then further treated in the manner described in Example 1. At least 50% of the mass of the nickel grid is thereby converted into nickel hydroxide. In spite of this severe attack, the plate retains its shape unchanged when used as an electrode, even after being frequently charged and discharged.

What we claim is:

1. A process for the production of electrodes for alkaline storage batteries which comprises: impregnating a porous, at least partly metallic electrode grid which is inactive to the electrolyte contained in said alkaline storage battery with an aqueous solution containing ammonium ions, and exposing the impregnated grid to an atmosphere of ammonia, water vapor, and oxygen, whereby an active composition obtained from said grid and comprising oxidic compounds of the metal contained in said grid is formed in the pores of said grid.

2. A process for the production of electrodes for alkaline storage batteries which comprises: impregnating a porous, at least partly metallic electrode grid with an aqueous solution of ammonium nitrate, and thereafter drying said grid by heating, whereby an active composition obtained from said grid and comprising oxidic compounds of the metal contained in said grid is formed in the pores of said grid.

3. A process according to claim 2, wherein the pH value of the solution is kept within the range of 4 to 10.

4. A process according to claim 2, wherein said drying is carried out at temperatures between 50 and 100° C.

5. A process according to claim 2, wherein prior to the impregnation with said aqueous solution of ammonium nitrate the grid is impregnated with an aqueous solution of nickel nitrate and dried.

6. A process according to claim 2, wherein after the drying of said grid the grid is impregnated with an aqueous solution of nickel nitrate and then treated with an alkali solution.

7. A process for the production of electrodes for alkaline storage batteries which comprises: impregnating a porous, at least partly metallic electrode grid with an aqueous solution of ammonium nitrate and nickel nitrate, whereby an active composition obtained from said grid and comprising oxidic compounds of the metal contained in said grid is formed in the pores of said grid.

References Cited by the Examiner

UNITED STATES PATENTS

| | | | |
|---|---|---|---|
| 2,634,303 | 4/1953 | Moulton | 136—6.2 |
| 2,696,515 | 12/1954 | Koren et al. | 136—34 |
| 2,880,257 | 3/1959 | Murphy et al. | 136—122 |
| 2,969,414 | 1/1961 | Fleischer | 136—78 |
| 3,041,388 | 1/1962 | Fukuda et al. | 136—29 |

FOREIGN PATENTS 581,849   8/1959   Canada.

WINSTON A. DOUGLAS, *Primary Examiner.*

JOHN H. MACK, *Examiner.*

W. VAN SISE, A. SKAPARS, *Assistant Examiners.*